United States Patent [19]
Kano et al.

[11] Patent Number: 5,767,598
[45] Date of Patent: Jun. 16, 1998

[54] MOTOR AND ELECTRONIC PARTS-MOUNTING APPARATUS INCORPORATING THE MOTOR

[75] Inventors: Yoshinori Kano; Kazuhiro Hineno, both of Gunma-Ken, Japan

[73] Assignee: Sanyo Electric Co., Ltd., Osaka, Japan

[21] Appl. No.: 756,757

[22] Filed: Nov. 26, 1996

[30] Foreign Application Priority Data

Nov. 30, 1995 [JP] Japan ................... 7-335731
Nov. 30, 1995 [JP] Japan ................... 7-335732

[51] Int. Cl.$^6$ ................ H02K 21/00; H05K 13/04
[52] U.S. Cl. .............. 310/91; 310/254; 310/261; 384/517
[58] Field of Search ................ 310/217, 254, 310/261, 91; 384/517, 563

[56] References Cited

U.S. PATENT DOCUMENTS

| | | | |
|---|---|---|---|
| 2,173,561 | 9/1939 | Olson | 384/517 |
| 3,900,232 | 8/1975 | Rode | 384/517 |
| 4,745,314 | 5/1988 | Nakano | 310/57 |
| 5,043,616 | 8/1991 | Katsuzawa et al. | 310/217 |

*Primary Examiner*—Thomas M. Dougherty
*Assistant Examiner*—B. Mullins
*Attorney, Agent, or Firm*—Darby & Darby

[57] ABSTRACT

There is provided a motor and an electronic parts-mounting apparatus incorporating the motor. The motor includes a rotor and a stator. The stator is comprised of a stator core formed of laminate of steel plates and arranged in a manner opposed to the rotor, holding members arranged on opposite ends of the laminate of the steel plates of the stator core, and bolts for fastening the two holding members to each other. The stator core extends to locations at which the bolts extend through the stator core.

4 Claims, 7 Drawing Sheets

F I G. 3
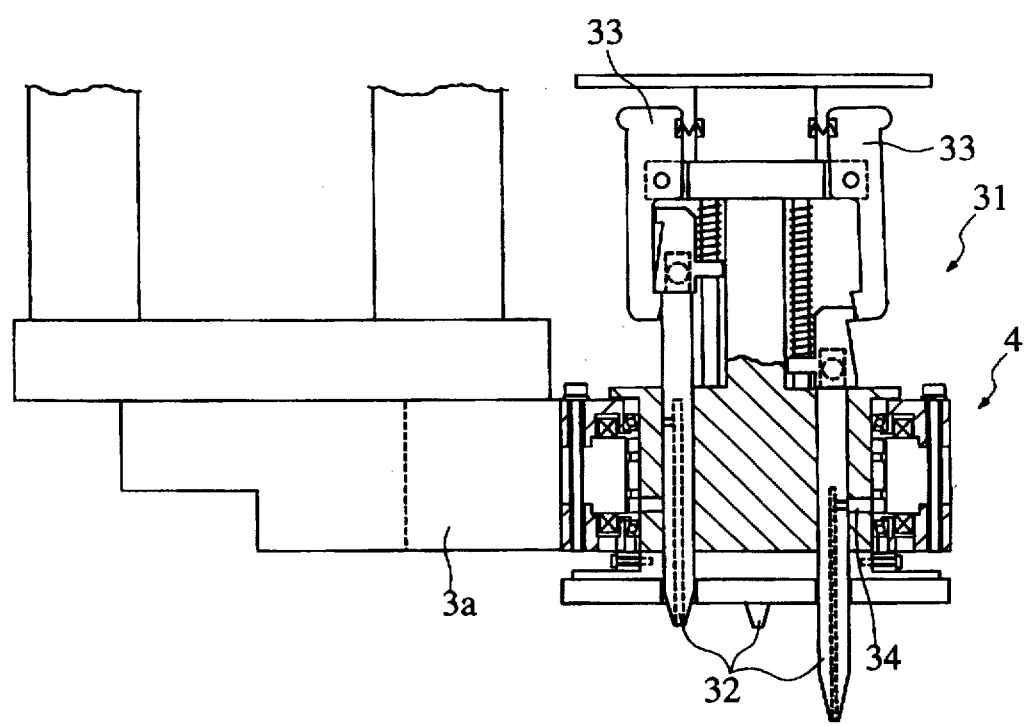

MOTOR AND ELECTRONIC PARTS-MOUNTING APPARATUS INCORPORATING THE MOTOR

BACKGROUND OF THE INVENTION

1. Field of the Invention

This invention relates to a motor having a stator which is comprised of a stator core formed of a laminate of steel plates, and holding members arranged on opposite ends of the laminate of the steel plates of the stator core in such a manner that the two holding members are fastened to each other by bolts, as well as an electronic parts-mounting apparatus incorporating the motor.

2. Prior Art

Conventionally, an electronic parts-mounting apparatus has been proposed e.g. by Japanese Laid-Open Patent Publication (Kokai) No. 6-334391, which is arranged between a parts-feeding station where a plurality of kinds of electronic parts are held in stock, and a parts-mounting station where circuit boards are supplied to have electronic parts mounted thereon. The electronic parts-mounting apparatus includes a rotary table and a plurality of mounting heads arranged on an outer periphery of the rotary table. Each of the mounting heads carries a plurality of sucking nozzles thereon for picking up an electronic part by sucking. The rotary table is intermittently rotated to thereby carry electronic parts picked up by a selected one of the sucking nozzles of each of the mounting heads from the parts-feeding station to the parts-mounting station. Arranged around the mounting head is a stepping motor for rotating the mounting head through predetermined angles about the rotational axis thereof to thereby enable selection of a sucking nozzle as desired. The construction of the conventional stepping motor is shown in FIG. 1.

In FIG. 1, reference numeral 101 designates a stator secured to an arm of the rotary table, not shown, which rotatably supports a rotor 102 as part of a mounting head by way of a pair of upper and lower deep-groove ball bearings 103. The rotor 102 has a pair of upper and lower permanent magnets 121 and rotor cores 122 each formed of a laminate of steel plates fit thereon in an alternate manner such that magnetic poles of the same kind are opposed to each other. Further, reference numeral 123 designates spacer rings. The permanent magnets 121 and the rotor cores 122 are sandwiched by the deep-groove ball bearings 103 by way of the spacer rings 123. On the other hand, the stator 101 is comprised of a stator core 111 formed of a laminate of steel plates having exciting coils 112 provided thereon, and two holding members 113 arranged respectively on the upper and lower sides of the stator core 111. The stator 101 is tightened by bolts 114 extending through both the holding members 113. A coned disc spring 115 is provided between associated ones of the deep-groove ball bearings 103 and the holding members 113. Further, the holding members 113 are each formed with annular clamping portions 116 at respective portions radially inward of the bolts 114, and the stator core 111 is tightened from both the opposite ends of the laminate of steel plates thereof by these annular clamping portions 116.

According to the conventional stepping motor, as described above, the clamping portions 116, via which the urging forces are directly applied to the stator core 111, are positioned radially inward of the bolts 114. Therefore, when the bolts 114 are tightened, the urging force or pressure acts on the stator core 111. However, the inner peripheral portions of the holding members 113, i.e. portions at which the deep-groove ball bearings 103 are retained are displaced in respective upward or downward directions, by the forces created by the tightening force of the bolt 114 about the fulcrums of points of contact between the clamping portions 116 and the stator core 111. This causes an undesired change in the manner in which the deep-groove ball bearings 103 are retained, so that the rotational axis of the rotor 102 deviates from its proper position. The deviation of the rotational axis of the rotor 102 causes the sucking nozzles to be displaced in the thrust direction or in the radial direction, and hence it is difficult to suck and mount electronic parts properly. It should be noted that the above inconvenience also occurs when a servomotor is employed instead of the stepping motor.

SUMMARY OF THE INVENTION

It is a first object of the invention to provide a motor which is free from undesired displacement of a rotor with respect to a stator, and shaky motion caused by such an undesired displacement.

It is a second object of the invention to provide an electronic parts-mounting apparatus which includes a motor which is free from undesired displacement of a rotor with respect to a stator, and shaky motion caused by such an undesired displacement.

To attain the first object, according to a first aspect of the invention, there is provided a motor including a rotor and a stator, the stator including a stator core which is formed of a laminate of steel plates and arranged in a manner opposed to the rotor, holding members arranged on opposite ends of the laminate of the steel plates of the stator core, and bolts fastening the holding members to each other.

The motor according to the first aspect of the invention is characterized in that the stator core extends to locations at which the bolts extend through the stator core.

According to this construction, since the stator core extends to locations at which the bolts extend through the stator core, pressure created by tightening of the bolts so as to act on the stator core by way of the holding members is dispersed through portions where the bolts extend, so that this pressure does not cause displacement, such as expansion or contraction, of the other portions of the stator core.

Preferably, the motor includes a pair of bearings arranged between the rotor and the holding members for rotatably supporting the rotor, each of the pair of bearings having an inner ring, an outer ring, and steel balls, one of the rotor and the holding members being provided with a pusher for urging either the outer ring or the inner ring of the pair of bearings toward the steel balls.

According to this construction, by urging either the outer ring or the inner ring toward the steel balls, the bearings themselves are prevented from developing shaking motions, so that the rotor and the holding members do not shake to and from each other.

For instance, the pusher comprises a plurality of bolts embedded in a side wall of the rotor at predetermined space intervals, and a plurality of eccentric nuts each screwed onto a corresponding one of the plurality of bolts for being brought into contact with either the outer ring or the inner ring of the bearings at part of a peripheral surface thereof.

Alternatively, the pusher comprises a metal retainer fitted on a peripheral portion of an end of one of the holding members, and bolts which are fastened to the one of the holding members for urging the metal retainer against the one of the holding members.

To attain the first object, according to a second aspect of the invention, there is provided a motor including a rotor and a stator, the stator including a stator core which is formed of a laminate of steel plates and arranged in a manner opposed to the rotor, holding members arranged on opposite ends of the laminate of the steel plates of the stator core, and bolts fastening the holding members to each other.

The motor according to the second aspect of the invention is characterized by comprising a pair of bearings interposed between the rotor and the stator core for rotatably supporting the rotor.

According to this construction of the second aspect of the invention, the bearings arranged between the rotor and the stator core positions the rotor and the stator core with respect to each other. Therefore, even if the holding members are displaced from their proper positions by tightening of the bolts, the bearings are free from influence of such an undesired displacement of the holding members.

Preferably, each of the pair of bearings has an inner ring, an outer ring, and steel balls, and one of the rotor and the holding members is provided with a pusher for urging either the outer ring or the inner ring of the pair of bearings toward the steel balls.

According to this construction, by urging either the outer ring or the inner ring toward the steel balls, the bearings themselves are prevented from developing shaky motions, so that the rotor and the holding members do not shake to and from each other.

To attain the second object, according to a third aspect of the invention, there is provided an electronic parts-mounting apparatus including sucking nozzles for picking up an electronic part by sucking, mounting heads for rotatably carrying the sucking nozzles, a carrying device for carrying the mounting heads, and motors for driving the mounting heads for rotation, respectively, the motors each including a rotor integrally formed with a corresponding one of the mounting heads, and a stator fixed to the carrying device, the stator having a stator core formed of a laminate of steel plates and arranged in a manner opposed to the rotor, holding members arranged on opposite ends of the laminate of the steel plates of the stator core, and bolts fastening the holding members to each other.

The electronic parts-mounting apparatus according to the third aspect of the invention is characterized in that the stator core extends to locations at which the bolts extend through the stator core.

According to this construction of the third aspect of the invention, the sucking nozzles are prevented from being tilted or vertically shaken due to shaky motions of the rotor, thereby enhancing the mounting accuracy of electronic parts by the sucking nozzles.

To attain the second object of the invention, according to a fourth aspect of the invention, there is provided an electronic parts-mounting apparatus including sucking nozzles for picking up an electronic part by sucking, mounting heads for rotatably carrying the sucking nozzles, a carrying device for carrying the mounting heads, and motors for driving the mounting heads for rotation, respectively, the motors each including a rotor integrally formed with a corresponding one of the mounting heads, and a stator fixed to the carrying device, the stator having a stator core formed of a laminate of steel plates and arranged in a manner opposed to the rotor, holding members arranged on opposite ends of the laminate of the steel plates of the stator core, and bolts fastening the holding members to each other.

The electronic parts-mounting apparatus according to the fourth aspect of the invention is characterized by comprising a pair of bearings interposed between the rotor and the stator core for rotatably supporting the rotor.

According to the construction of the fourth aspect of the invention, the sucking nozzles are prevented from being tilted or vertically shaken due to shaky motions of the rotor, thereby enhancing the mounting accuracy of electronic parts by the sucking nozzles.

Preferably, each of the pair of bearings has an inner ring, an outer ring, and steel balls, and one of the rotor and the holding members is provided with a pusher for urging either the outer ring or the inner ring of the pair of bearings toward the steel balls.

The above and other objects, features, and advantages of the invention will become more apparent from the following detailed description taken in conjunction with the accompanying drawings.

BRIEF DESCRIPTION OF THE DRAWINGS

FIG. 3 is a sectional view showing a mounting head including a stepping motor according to a first embodiment of the invention;

DETAILED DESCRIPTION

The invention will now be described in detail with reference to the drawings showing embodiments thereof.

Figure 2:
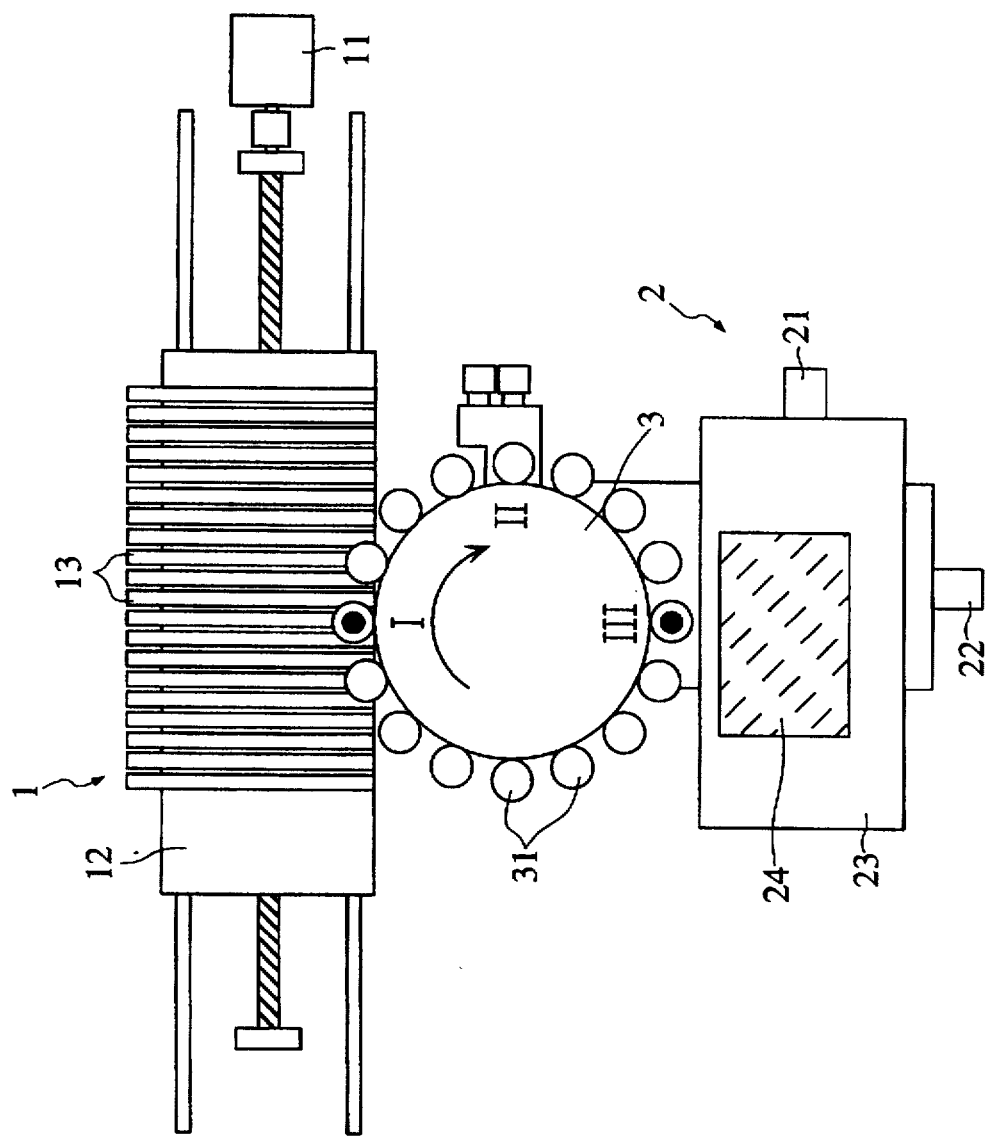
FIG. 2 is a plan view showing an outline of the whole arrangement of an electronic parts-mounting apparatus to which the invention is applied.

Referring first to FIG. 2, there is shown an electronic parts-mounting apparatus according to a first embodiment of the invention. Reference numeral 1 designates a parts-feeding station which includes a feed table 12 which is slid for positioning by a servomotor 11, and a plurality of parts-feeding devices 13 for selectively feeding a plurality of kinds of electronic parts. The parts-feeding devices 13 are removably mounted on the feed table 12 in a fashion extending transversely to the directions of forward/backward movements of the feed table 12 in parallel with each other. Reference numeral 2 designates a parts-mounting station which includes an X–Y table 23 which is moved in the directions of an X axis and a Y axis for positioning by cooperation of two servomotors 21, 22. A circuit board 24 is placed on the X–Y table 23. Arranged between the parts-feeding station 1 and the parts-mounting station 2 is a rotary table 3 which is intermittently rotated or indexed through a predetermined angle about the rotational axis thereof whenever it is rotated.

A plurality of mounting heads 31 are arranged on the outer periphery of the rotary table 3 by way of arms 3a, referred to hereinafter, at equally spaced intervals each corresponding to the predetermined angle about the rotational axis of the rotary table 3. When the mounting head 31 is indexed to a position designated by reference numeral I, it picks up a desired kind of electronic part by sucking. Then, while the mounting head 31 is being indexed through a position designated by reference numeral II to a position designated by reference numeral III, the electronic part carried by the mounting head 31 has a position or orientation thereof detected by a sensor, not shown. After having its position or orientation corrected, the electronic part is mounted on the circuit board 24 at the position III by the mounting head 31.

As shown in FIG. 3, a stepping motor 4 is arranged around the mounting head 31 in a manner rotatably connecting the mounting head 31 with the arm 3a of the rotary table 3. A plurality of sucking nozzles 32 to be positioned (selected) by the stepping motor 4 are mounted on the mounting head 31 such that they can be lifted or lowered. The sucking nozzles 32 have tips different in shape from each other, and are hooked and held by claw-shaped members 33 when they are at their highest position.

During a time period in which the mounting head 31 returns from the position III to the position I, one of the sucking nozzles 32 which corresponds to the kind of an electronic part to be sucked next time is moved outward by rotation of the stepping motor 4, and the sucking nozzle 32 is unhooked from the claw-shaped member 33 by a swing of the claw-shaped member 33 caused by a device, not shown, to bring the same to its lowest position, while another sucking nozzle 32 having been used is lifted and hooked to the claw-shaped members 33. An air-drawing line provided through the sucking nozzle 32 is communicated with a suction port 34. The suction port 34 is communicated with a vacuum generator, not shown, to thereby enable the lowered sucking nozzle 32 to pick up an electronic part at its tip.

Figure 1:
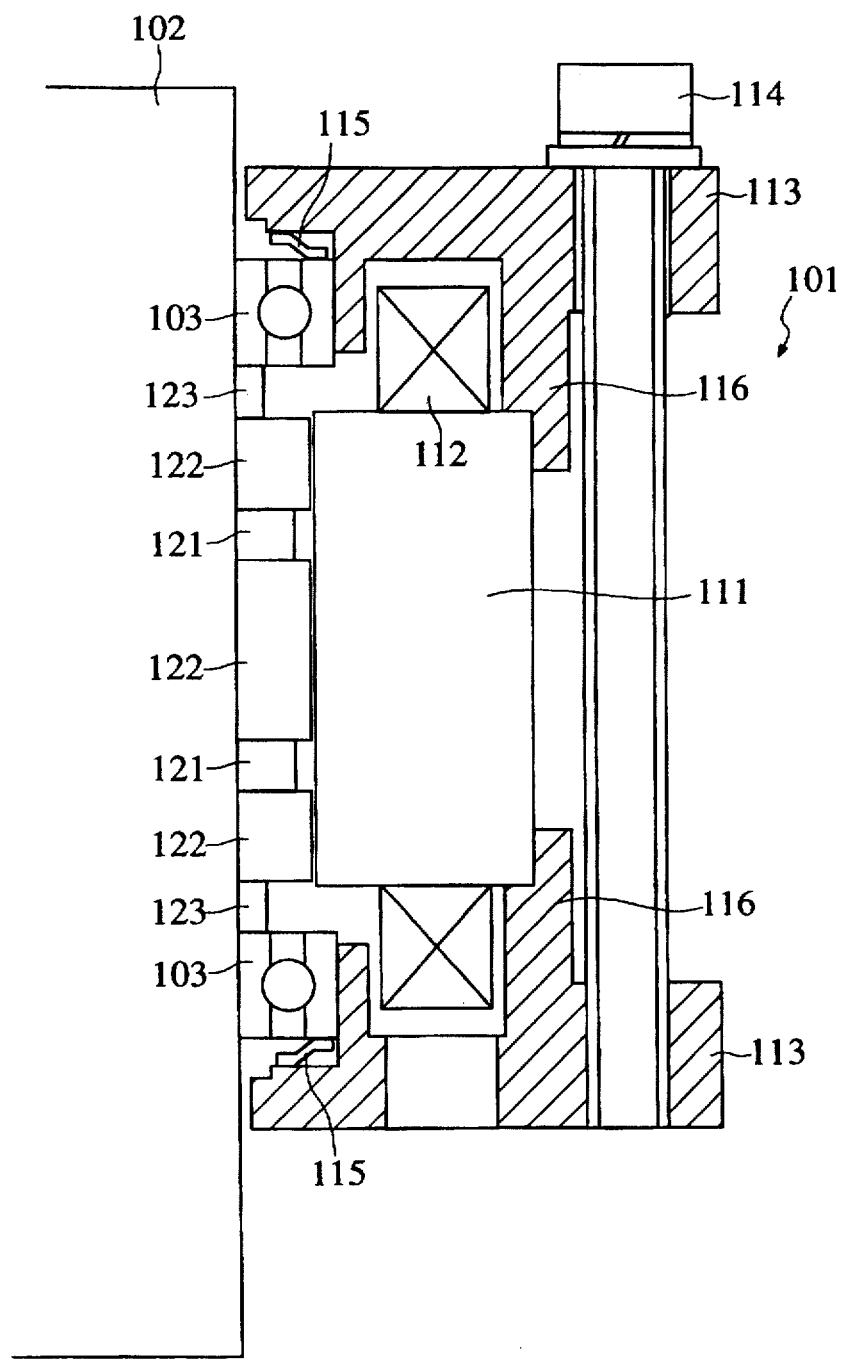
FIG. 1 is a fragmentary sectional view showing the arrangement of a conventional stepping motor.
Figure 4:
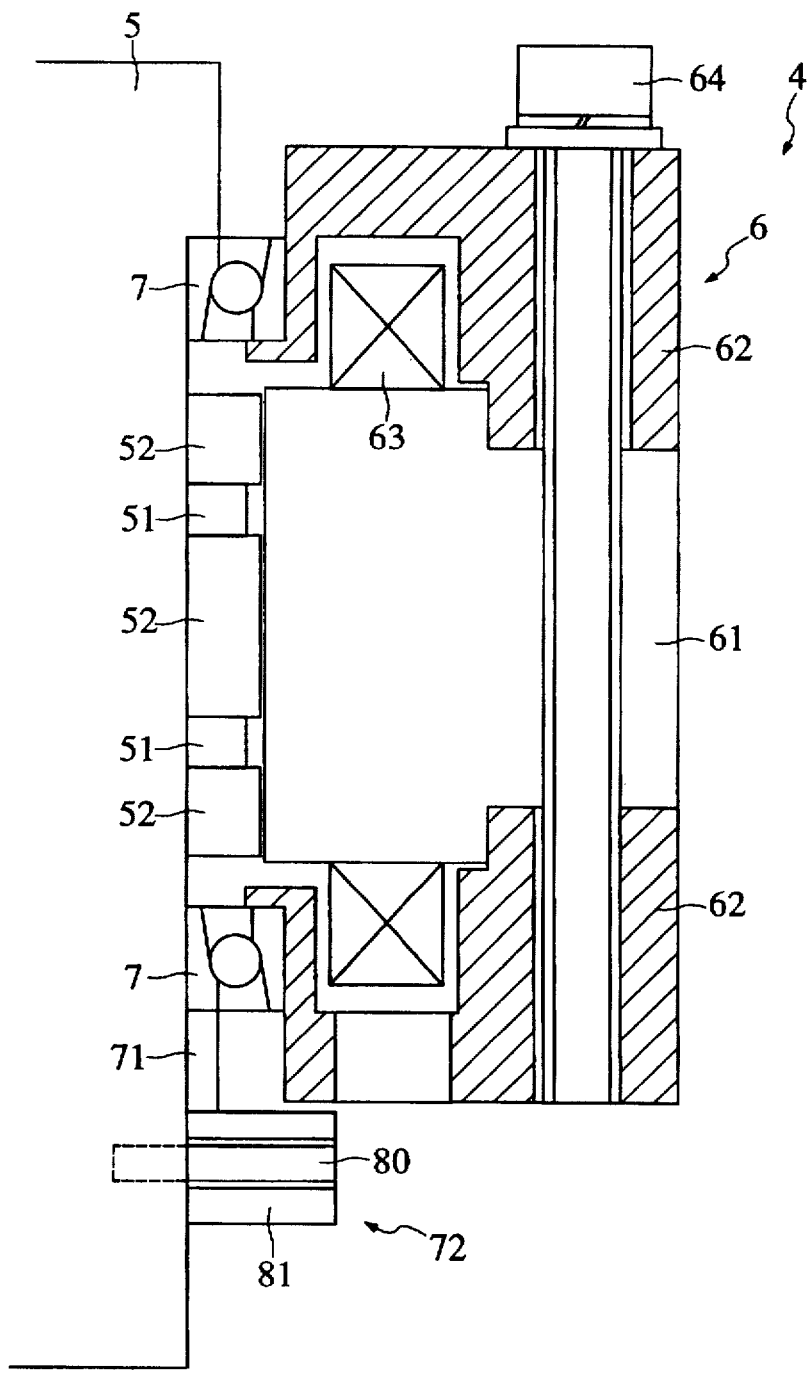
FIG. 4 is a fragmentary sectional view showing parts and elements essential to the construction of the FIG. 3 stepping motor.

FIG. 4 shows details of the construction of the stepping motor 4. The stepping motor 4 is comprised of a stator 6 secured to the rotary table 3, a rotor 5 having the sucking nozzles 32 and the claw-shaped members 33 mounted thereon, and a pair of angular bearings 7, such as angular contact ball bearings, arranged between the stator 6 and the rotor 5 at respective upper and lower locations for rotatably supporting the rotor 5. Similarly to the conventional rotor shown in FIG. 1, the rotor 5 has two permanent magnets 51 and three rotor cores 52 fitted thereon in an alternating manner. On the other hand, the stator 6 includes a stator core 61 having a generally annular shape similar to the conventional one shown in FIG. 1, and a pair of holding members 62 for holding the stator core 61 at the upper and lower ends thereof. The stator core 61 and the holding members 62 are joined together by bolts 64.

The stator core 61 employed in the present embodiment shown in FIG. 4 is constructed such that its outer peripheral surface is flush with an outer peripheral surface of each holding member 62. Therefore, the bolt 64 extends through the stator core 61 as well as the two holding members 62. Although the stator core 61 of the present embodiment extends radially outward such that its outer peripheral surface is flush with those of the holding members 62, this is not limitative, but it suffices to cause the stator core 61 to extend radially outward to locations at which the bolts 64 can extend through the same. If the bolts 64 extend through the stator core 61 as described above, pressure produced by bolting the holding members 62 and the stator core 61 with the bolts 14 acts perpendicularly to the laminate of steel plates, i.e. linearly in the direction of lamination of steel plates of the stator core 61, so that no moment is generated which would push the upper and lower holding members 62 upward and downward, respectively. Further, steps are formed on the holding members 62 and the stator core 61 at respective opposed portions brought into contact with each other in a complemetary manner to thereby cause a gap between the stator core 61 and the rotor core 52 to be maintained accurately.

Further, in FIG. 4, reference numeral 63 designates exciting coils, one of which is shown, provided on the stator core 61. The lower angular bearing 7 is preloaded by a pusher 72 by way of a spacer ring 71. The pusher 72 is comprised of a plurality of bolts 80 embedded in a side wall of the rotor 5 at predetermined space intervals and nuts 81 for screwing onto the bolts 80, respectively. Each nut 81 is eccentric, so that the inner ring of the lower angular bearing 7 can be stably urged against steel balls contained therein by adjusting a mounting angle of the nut 81 such that no shaky motion is developed by the lower angular bearing 7. This pressure acts on the upper angular bearing 7 as well by way of the stator 6, whereby the upper and lower angular bearings 7 are prevented from developing shaky motions.

As a result, the angular bearings 7 are prevented from shaking or swaying in the thrust direction or in the radial direction, and hence the sucking nozzles are prevented from making shaky motions. Further, deep-groove ball bearings may be employed instead of the angular bearings 7.

Figure 5:
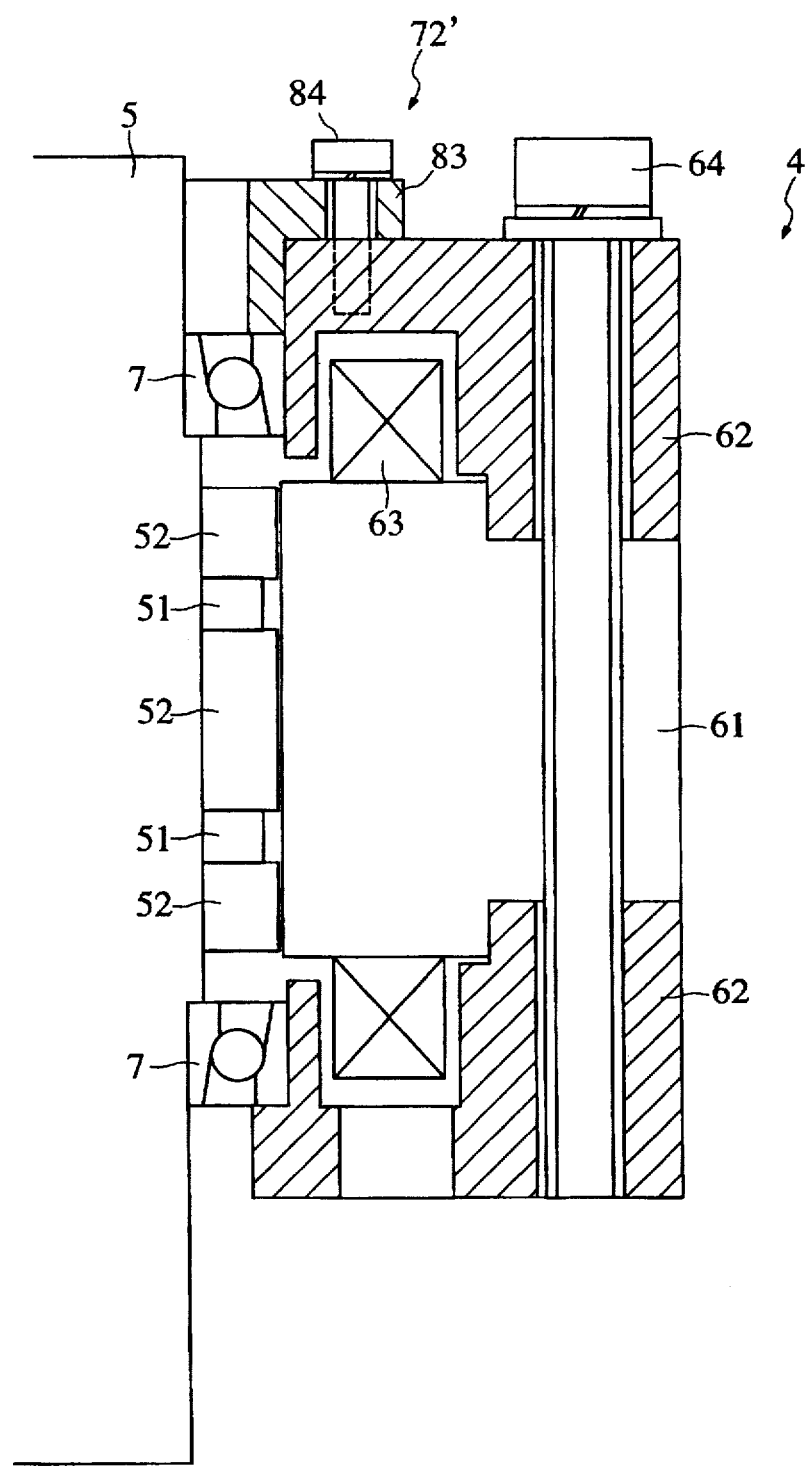
FIG. 5 is a fragmentary sectional view showing parts and elements essential to the construction of the stepping motor according to a variation of the first embodiment.

Although in the embodiment shown in FIG. 4, the angular bearings 7 are preloaded by the nuts 81 screwed onto the bolts 80 embedded in the rotor 5, this is not limitative, but, as shown in FIG. 5, a metal retainer 83 fitted on an annular peripheral corner of one end (upper end, as viewed in FIG. 5) of one (upper one) of the holding members 62 of the stator 6 and blots 84 for fastening the metal retainer 83 to the one of the holding members 62 may be employed for preloading the angular bearings 7. This arrangement is advantageous in that the bolts 80 and the nuts 81 as possible factors causing unbalanced rotation of the rotor 5 can be eliminated.

Figure 6:
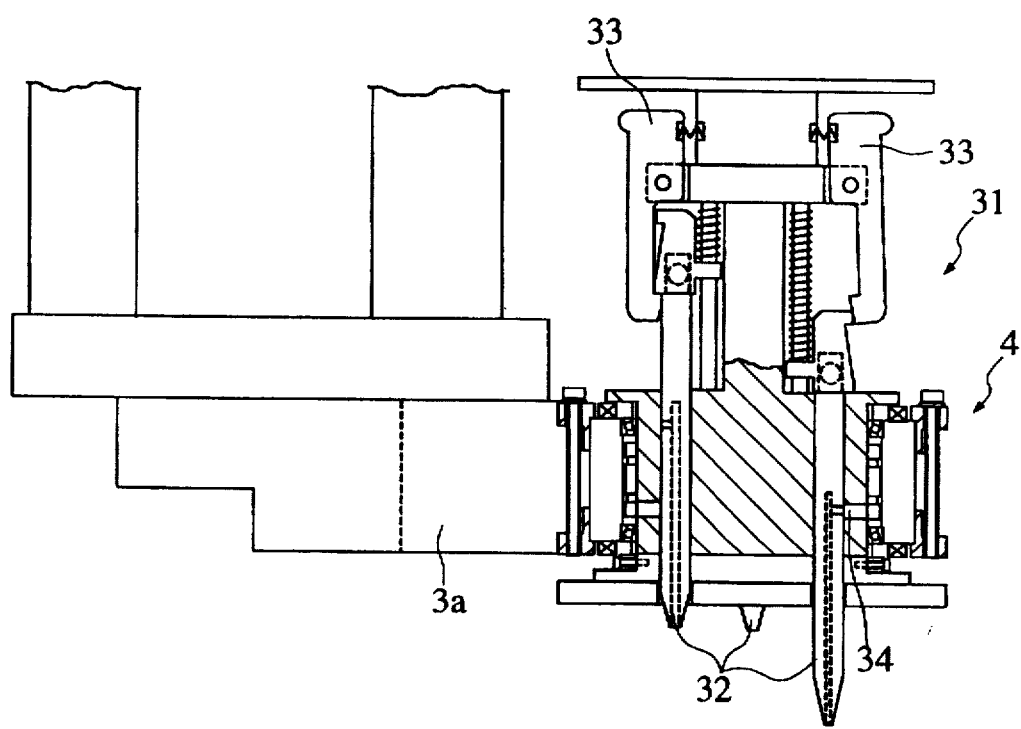
FIG. 6 is a sectional view showing a mounting head including a stepping motor according to a second embodiment of the invention.
Figure 7:
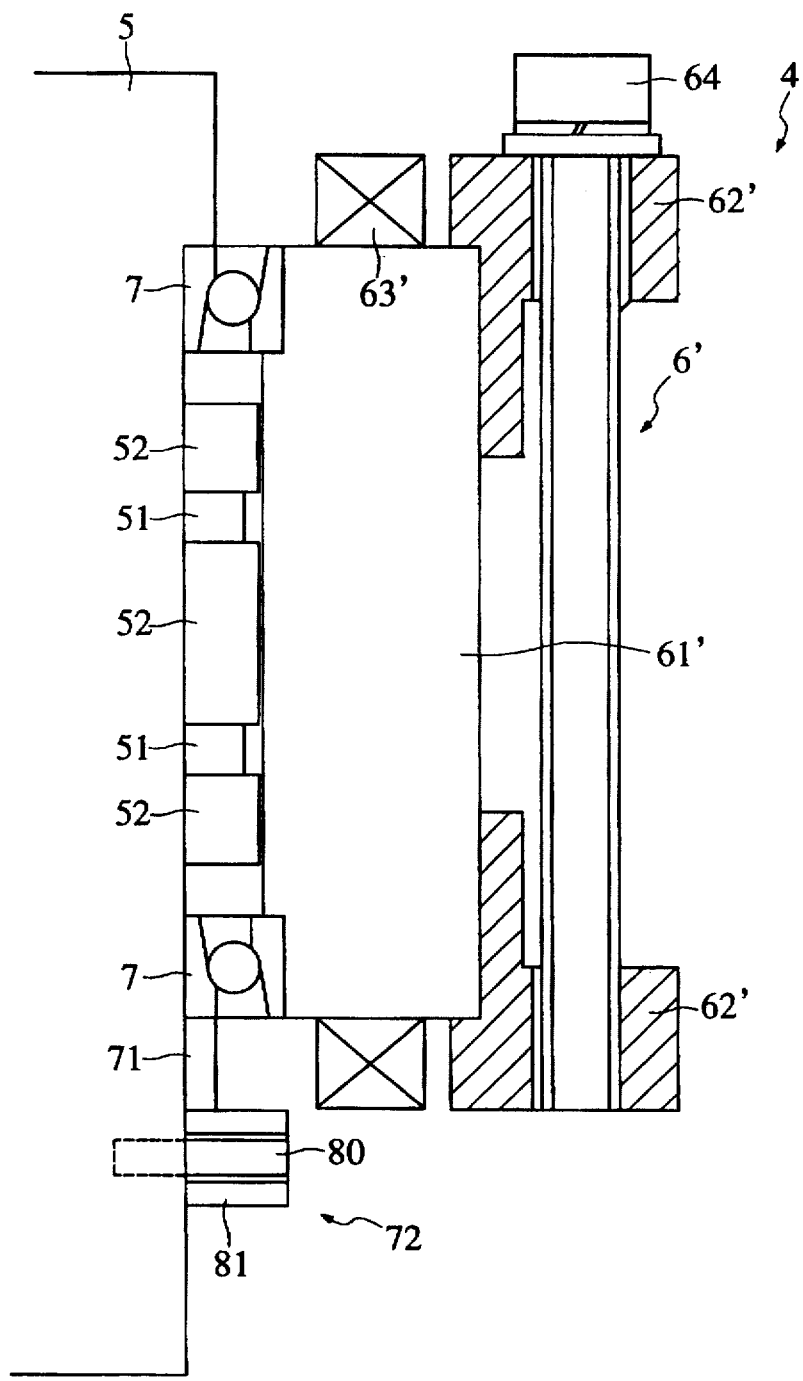
FIG. 7 is a fragmentary sectional view showing parts and elements essential to the construction of the FIG. 6 stepping motor.

Next, a second embodiment of the invention will be described with reference to FIGS. 6 and 7. Elements and parts corresponding to those of the first embodiment are designated by identical reference numerals, and detailed description thereof is omitted. FIG. 6 shows a mounting head including a stepping motor according to the present embodiment. FIG. 7 shows essential parts and elements of the present embodiment.

In the present embodiment, as shown in FIG. 7, a pair of angular bearings 7 are arranged or interposed between a rotor 5 and a stator core 61'. In forming the stator core 61', steel plates at upper and lower ends of the laminate which are brought into contact with the angular bearings 7 are blanked such that the diameter of the inner periphery of the resulting steel plates is slightly smaller than that of the outer rings of the angular bearings 7, and after the stator 6' is assembled or fastened into a unit by tightening the bolts 64 extending through the holding members 62', portions of the steels plates at the upper and lower ends of the laminate are bored for receiving the angular bearings 7 thereat. Then, after exciting coils 63' are provided on the stator core 61', the angular bearings 7 are fitted in the stator core 61'. In this connection, the inner and outer rings of the angular bearings 7 can be made of stainless steel having weak magnetic properties and/or the balls can be made of ceramics to thereby minimize leakage of magnetic flux via the angular bearings 7.

By interposing the angular bearings 7 between the rotor 5 and the stator core 61' as described above, it is possible to prevent the fastening of the bolts 64 from having an undesired influence on the angular bearings 7 to thereby cause the positional relationship between the rotor 5 and the stator core 61' to be maintained with accuracy. Further, although in the embodiment shown in FIG. 7, the angular bearings are preloaded by the nuts 81 screwed onto the bolts 80 embedded in a side wall of the rotor 5, this is not limitative, but similarly to the variation of the first embodiment, a metal retainer mounted on the stator core of the stator 6' may be used for that purpose.

Further, although in the above embodiments and their variations, the stepping motor 4 is arranged on the periphery of the mounting head 31 for rotatably connecting the mounting head 31 with the rotary table 3 at a location between the arm 3a of the rotary table 3 and the mounting head 31, this is not limitative, but a servomotor may be provided instead of the stepping motor 4. In such a case, it goes without saying that the above-described construction essential to the present invention can be applied to the servomotor.

What is claimed is:

1. In a motor including a rotor and a stator, said stator including a stator core formed of a laminate of steel plates arranged opposed to said rotor, holding members arranged on opposite ends of said laminate of said steel plates, and bolts fastening said holding members to each other, said stator core extending to locations at which said bolts extend through said stator core;

a pair of bearings arranged between said rotor and said holding members for rotatably supporting said rotor, each of said pair or bearings having an inner ring, an outer ring, and steel balls, one of said rotor and said holding members being provided with a pusher for urging either said outer ring or said inner ring of said pair or bearings toward said steel balls, wherein said pusher comprises a plurality of bolts embedded in a side wall of said rotor at predetermined spaced intervals, and a plurality of eccentric nuts each screwed onto a corresponding one of said plurality of bolts to be brought into contact with either said outer ring or said inner ring of said bearings at part of a peripheral surface thereof.

2. In a motor including a rotor and a stator, said stator including a stator core formed of a laminate of steel plates arranged in a manner opposed to said rotor, holding members arranged on opposite ends of said laminate of said steel plates, and bolts fastening said holding members to each other;

a pair or bearings interposed between said rotor and said stator core for rotatably supporting said rotor, each of said pair of bearings having an inner ring, an outer ring, and steel balls, and wherein one of said rotor and said holding members is provided with a pusher for urging either said outer ring or said inner ring of said pair of bearings toward said steel balls, wherein said pusher comprises a plurality of bolts embedded in a side wall of said rotor at predetermined spaced intervals, and a plurality of eccentric nuts each screwed onto a corresponding one of said plurality of bolts for being brought into contact with either said outer ring or said inner ring of said bearings at part of a peripheral surface thereof.

3. In an electronic parts-mounting apparatus including sucking nozzles for picking up an electronic part by sucking, mounting heads for rotatably carrying said sucking nozzles, a carrying device for carrying said mounting heads, and motors for driving said mounting heads for rotation, respectively, each said motor including a rotor integrally formed with a corresponding one of said mounting heads, and a stator fixed to a said carrying device, said stator having a stator core formed of a laminate of steel plates arranged opposed to said rotor, holding members arranged on opposite ends of said laminate of said steel plates, and bolts fastening said holding members to each other, said stator core extending to locations at which said bolt extend through said stator core, a pair of bearings arranged between said rotor and said holding members for rotatable supporting said rotor, each of said pair of bearings having an inner ring, an outer ring, and steel balls, one of said rotor and said holding members being provided with a pusher for urging either said outer ring or said inner ring of said pair of bearings toward said steel balls, wherein said pusher comprises a plurality of bolts embedded in a side wall of said rotor at predetermined spaced intervals, and a plurality of eccentric nuts each screwed onto a corresponding one of said plurality of bolts for being brought into contact with either said outer ring or said inner ring of said bearings at part of a peripheral surface thereof.

4. In an electronic parts-mounting apparatus including sucking nozzles for picking up an electronic part by sucking, mounting heads for rotatably carrying said sucking nozzles, a carrying device for carrying said mounting heads, and motors for driving said mounting heads for rotation, respectively, each said motor including a rotor integrally formed with a corresponding one of said mounting heads, and a stator fixed to said carrying device, said stator having a stator core formed of a laminate of steel plates arranged opposed to said rotor, holding members arranged on opposite ends of said laminate of said steel plates, and bolts fastening said holding members to each other, a pair of bearings interposed between said rotor and said stator core for rotatably supporting said rotor, each of said pair of bearings having an inner ring, an outer ring, and steel balls, one of said rotor and said holding members being provided with a pusher for urging either said outer ring or said inner ring of said pair of bearings toward said steel balls, wherein said pusher comprises a plurality of bolts embedded in a side wall of said rotor at predetermined spaced intervals, and a plurality of eccentric nuts each screwed onto a corresponding one of said plurality of bolts for being brought into contact with either said outer ring or said inner ring of said bearings at part of a peripheral surface thereof.

* * * * *